(12) United States Patent
Bergman et al.

(10) Patent No.: US 7,198,563 B2
(45) Date of Patent: Apr. 3, 2007

(54) SHOE TENSIONING LINKAGE FOR MEAT SKINNER

(75) Inventors: Matthew A. Bergman, Des Moines, IA (US); Kenneth L. Lebsack, Ankeny, IA (US); James L. Myers, Urbandale, IA (US); Matthew P. Sawhill, Des Moines, IA (US); Brent M. Veldkamp, Cumming, IA (US)

(73) Assignee: Stork Townsend Inc., Des Moines, IA (US)

( * ) Notice: Subject to any disclaimer, the term of this patent is extended or adjusted under 35 U.S.C. 154(b) by 0 days.

(21) Appl. No.: 11/160,751

(22) Filed: Jul. 7, 2005

(65) Prior Publication Data

US 2007/0026782 A1 Feb. 1, 2007

(51) Int. Cl.
*A22B 5/16* (2006.01)
(52) U.S. Cl. ....................................... 452/129
(58) Field of Classification Search ................ 452/125, 452/127–136
See application file for complete search history.

(56) References Cited

U.S. PATENT DOCUMENTS

| | | | |
|---|---|---|---|
| 736,278 A | 8/1903 | Lombard et al. | |
| 2,539,692 A * | 1/1951 | Hickman et al. | 452/127 |
| 2,569,402 A | 9/1951 | Cantalupo et al. | |
| 2,578,952 A * | 12/1951 | Townsend | 99/589 |
| 2,722,255 A | 11/1955 | Townsend | |
| 3,215,179 A | 11/1965 | Schill | |
| 4,250,594 A * | 2/1981 | Mitchell | 452/127 |
| 4,253,318 A * | 3/1981 | Repetto | 69/9.1 |
| 4,670,943 A | 6/1987 | Townsend | |
| 5,350,334 A * | 9/1994 | Holms | 452/127 |
| 5,429,548 A * | 7/1995 | Long et al. | 452/127 |
| 6,086,470 A | 7/2000 | Ranniger | |
| 6,213,863 B1 * | 4/2001 | Basile et al. | 452/127 |
| 6,689,138 B2 | 2/2004 | Lechot et al. | |
| 6,824,460 B2 * | 11/2004 | Young et al. | 452/83 |
| 2002/0128658 A1 | 9/2002 | White | |

* cited by examiner

*Primary Examiner*—Thomas Price

(57) ABSTRACT

A skinning machine includes a frame, a linkage assembly mounted to the frame, and a skinning assembly mounted to the linkage assembly via lift arms. The linkage assembly raises and lowers the skinning assembly via the lift arms from an open to a closed position, wherein the linkage assembly is located on one side of the skinning assembly. A spring cartridge is operatively associated with the lift arms via an intermediate link to equally apply bias force from the spring cartridge to the independently rotatable lift arms. The linkage assembly includes a cam slot provided through a cam arm to slidably receive a pin therein. The cam slot is shaped to lock the pin when the linkage assembly is in the closed position. A cam block is mounted to the frame and includes a cam notch adapted to slidably secure the end of the pin in a locked open position.

12 Claims, 6 Drawing Sheets

SHOE TENSIONING LINKAGE FOR MEAT SKINNER

BACKGROUND OF THE INVENTION

This invention is directed toward skinning machines for removing skin and fat from meat parts, and more particularly toward a skinning machine that has a linkage assembly adapted to raise and lower a skinning assembly on the skinning machine.

In the meat processing industry, it is necessary and desirable to remove the skin and/or fat from a meat part, before separating the muscles for processing. To date, this is often done manually, using knives. Not only does this manual method require substantial labor, but it also is time consuming and creates safety hazards with the potential for lacerations and cumulative trauma injuries. Alternatively, automated systems have been used to remove the skin and/or fat, but these conventional automated systems have an abundance of parts with a great number of wear points, and also have insufficient means for properly balancing the force on both sides of the skinning assembly.

Specifically, typical automated systems are used in a variety of applications, each with unique requirements of the machine setup. In several of these applications, it is necessary for a shoe of the skinning assembly to rigidly maintain position relative to a toothroll. In others, it is necessary for the shoe to "float" relative to the toothroll, so it can respond to variations in product thickness. In some of these automated systems, mounting of the shoe is accommodated in a variety of ways. Often, the shoe mounting mechanism is the most sophisticated part of the machine, and it has a fundamental impact on the operating performance of the skinner. In general, the skinning assembly is positioned either rigidly or non-rigidly to "float" on either end. Generally, it is desirable to allow the shoe to float in such a way that the two sides of the shoe can move independently. Thus, one side of the blade on the skinning assembly may take a deeper cut in the product than the opposite side of the blade. Additionally, the skinning assembly may be cleaned by elevating the skinning assembly into a cleaning position. In the cleaning position, the skinning assembly may be located far enough away from the toothroll to facilitate wash down of the toothroll and all sides of the skinning assembly.

These conventional skinning machines work well for certain applications, but suffer from certain deficiencies. Specifically, a large number of parts are required for providing "float" capabilities to the skinning assembly, as well as providing a mechanism for elevating the skinning assembly. With this large number of parts, there are a great deal of points prone to wear in the conventional skinning machines. Additionally, in skinning machines where the skinning assembly "floats", there is a lack of any mechanism for balancing the force applied between the two sides of the skinning assembly.

Therefore, a primary objective of this invention is to provide an apparatus for self-balancing between the two sides of the skinning assembly.

Another objective of this invention is to provide a skinning machine with fewer parts that are more economical to manufacture.

A further objective of this invention is to provide an apparatus for lifting the skinning assembly with an asymmetric design primarily located on one side of the skinning assembly.

These and other objectives will be apparent to those skilled in the art based on the following disclosure.

SUMMARY OF THE INVENTION

A skinning machine includes a frame, a linkage assembly mounted to the frame, and a skinning assembly mounted to the linkage assembly via lift arms. The linkage assembly is adapted to raise and lower the skinning assembly via the lift arms from an open position for cleaning to a closed position for skinning, wherein the linkage assembly is located on one side of the skinning assembly. A spring cartridge is operatively associated with the lift arms via an intermediate link, wherein the intermediate link is adapted to equally apply bias force from the spring cartridge to the independently rotatable lift arms.

A release lever is rotatably mounted on the frame so that a user can move the linkage assembly from a closed position to an open position. The linkage assembly includes a cam arm attached to the release lever to rotate therewith. A cam slot is provided through the cam arm to slidably receive a pin therein, wherein the cam slot is shaped to lock the pin when the linkage assembly is in the closed position. A clevis attached to the spring cartridge secures the pin within the cam slot so that an end of the pin extends from the edge of the clevis. A cam block mounted to the frame includes a cam notch adapted to slidably receive the end of the pin extending from the clevis to lock the assembly in a raised or open position.

DETAILED DESCRIPTION OF THE PREFERRED EMBODIMENT

Figure 1:
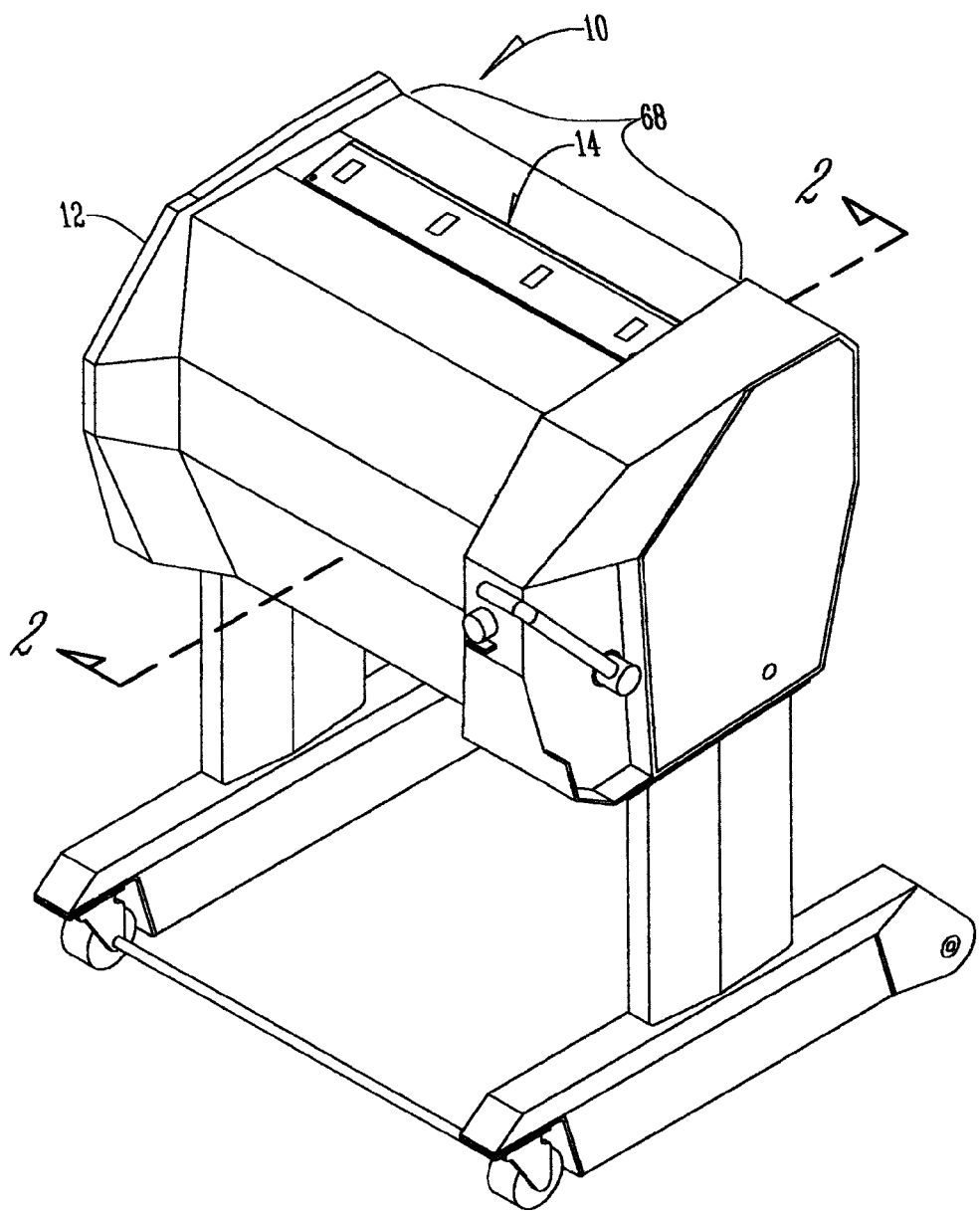
FIG. 1 is a perspective view of a skinning machine.
Figure 2:
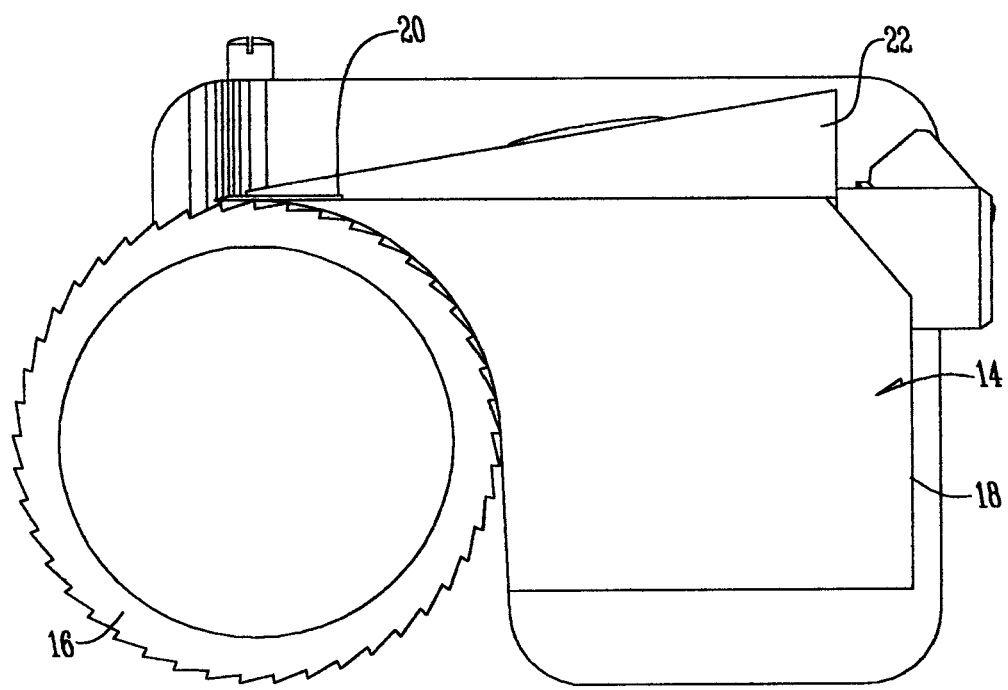
FIG. 2 is a cross sectional view of the toothroll and skinning assembly taken along line 2—2 of FIG. 1.

Referring to FIGS. 1 and 2, a skinning machine 10 has a frame 12 with a skinning assembly 14 and a toothroll 16 operatively associated with the frame 12. The toothroll 16 is rotatably mounted to the frame 12. The toothroll 16 is driven by a drive mechanism (not shown). The drive mechanism includes but is not limited to, any conventional drive device operatively connected to a power source (not shown).

The skinning assembly 14 is positioned in spaced relation to the toothroll 16. The skinning assembly 14 includes a shoe 18 with a blade clamp 22 attached thereto for receiving and holding a skinning blade 20. The skinning blade 20 is positioned between the shoe 18 and the clamp 22 such that blade 20 is adjacent the radial surface of the toothroll 16. The toothroll 16 assists in directing a layer of skin and/or fat of a meat part (not shown) between the shoe 18 and the toothroll 16. The toothroll 16, shoe 18, and skinning blade 20 remove the skin and/or fat from the meat part and provide a pulling force to pull the layer of skin and/or fat toward the skinning assembly 14.

Figure 3:
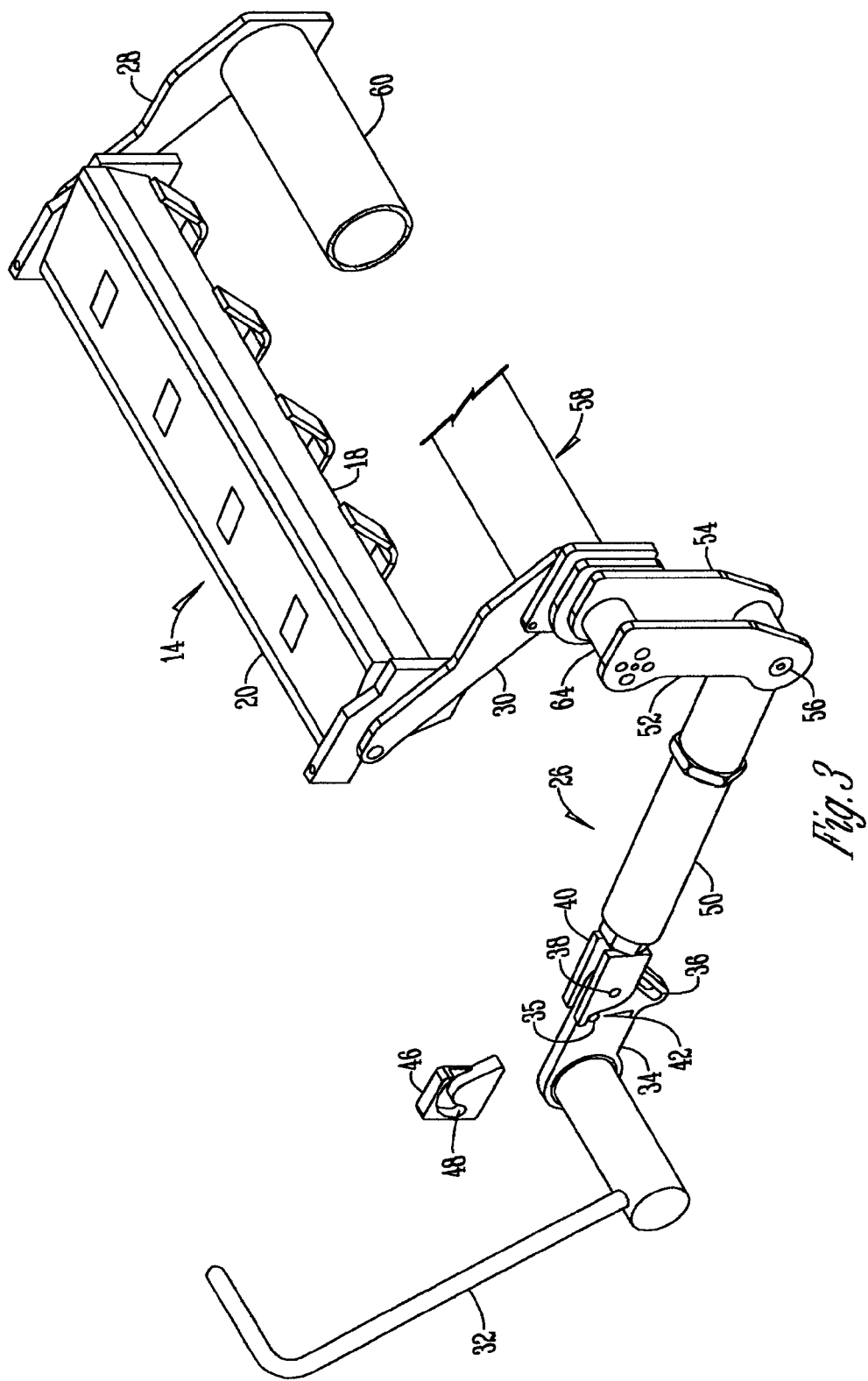
FIG. 3 is a perspective view of a linkage assembly and skinning assembly.
Figure 4:
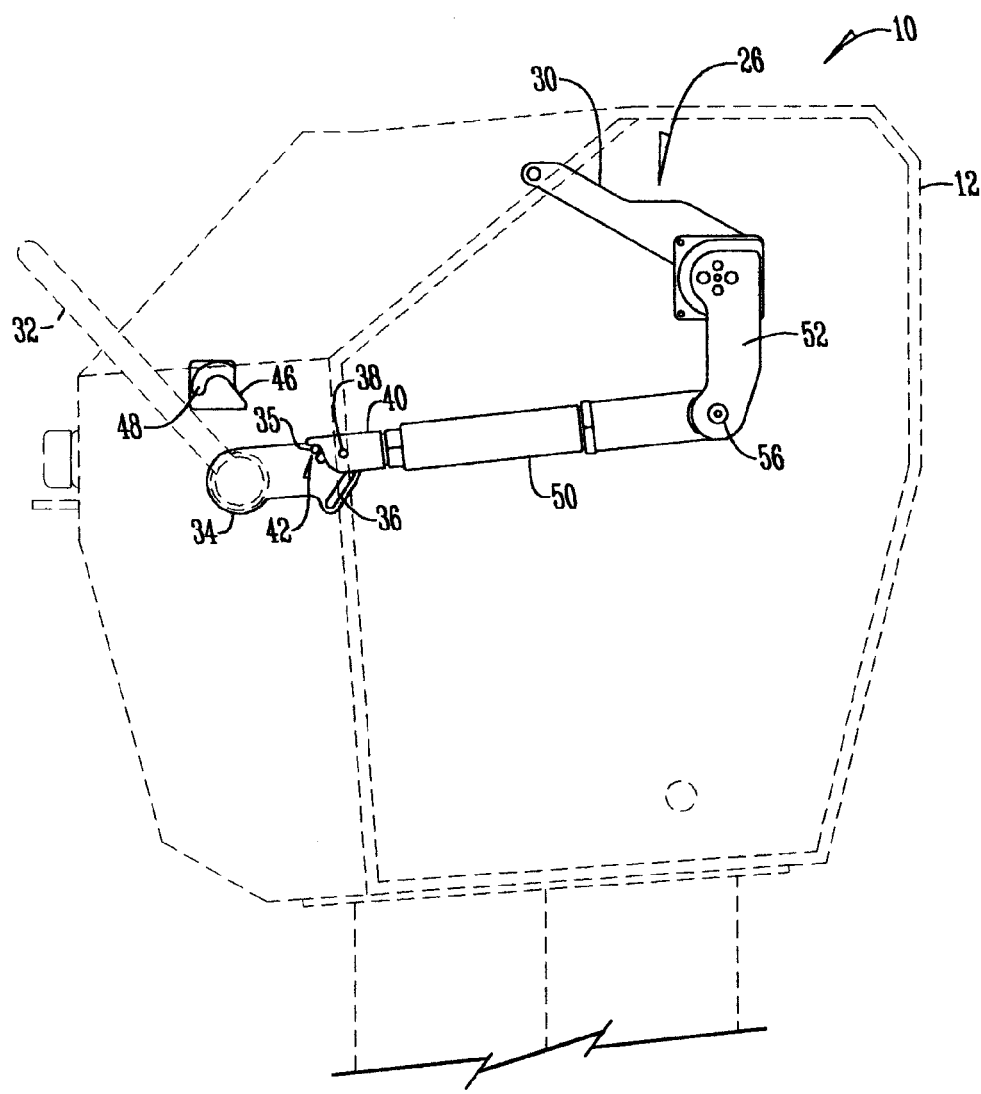
FIG. 4 is a side elevation view of the linkage assembly in the closed position.
Figure 5:
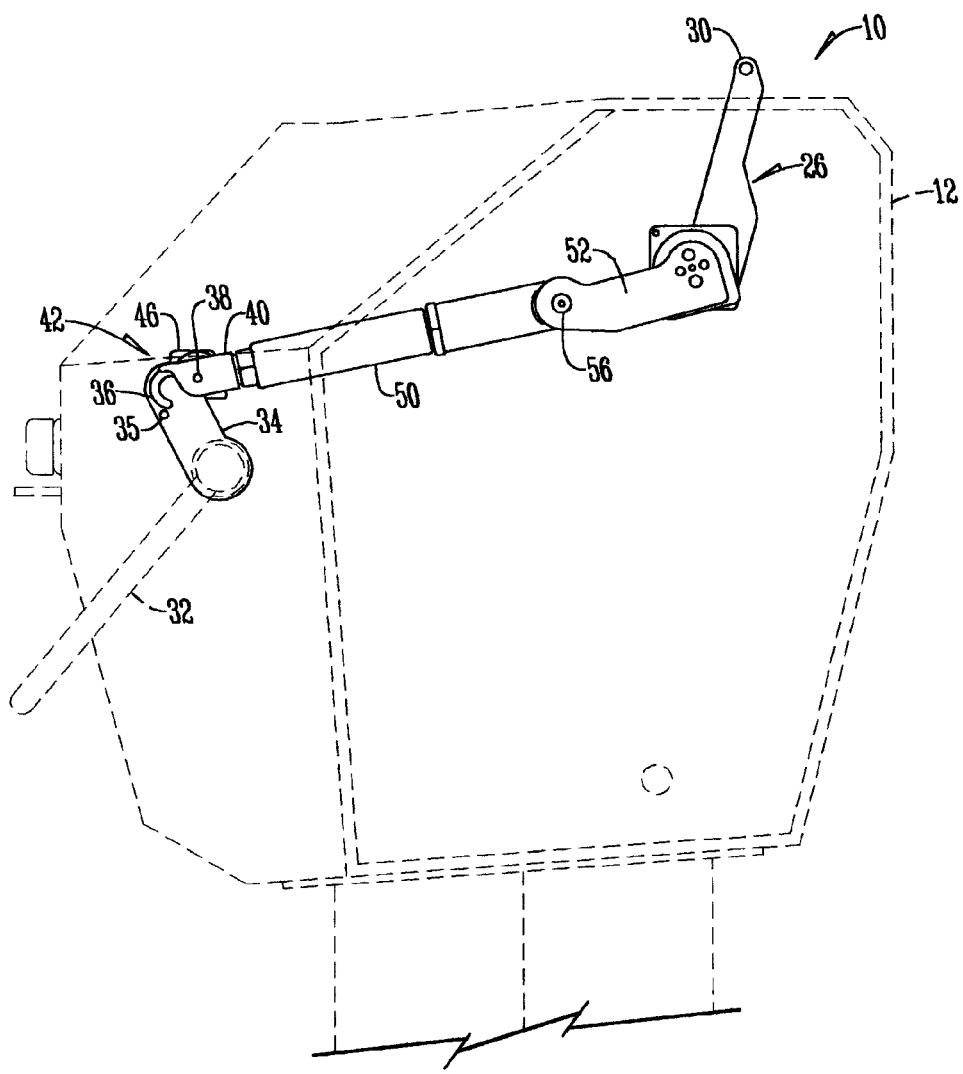
FIG. 5 is a side elevation view of the linkage assembly in the open position.

Referring to FIGS. 3–5, a linkage assembly 26 is mounted to the frame 12. The linkage assembly 26 is adapted to raise and lower the skinning assembly 14 via first and second lift arms 28, 30 from an open position for cleaning (see FIG. 5)

to a closed position for skinning (see FIG. 4). As shown, the linkage assembly 26 is located on one side of the skinning assembly 14.

The linkage assembly 26 includes a release lever 32 rotatably mounted to the frame 12 so that the linkage assembly 26 moves the skinning assembly from a closed (FIG. 4) to an open position (FIG. 5). A cam arm 34 is attached to the release lever 32 to rotate therewith and has a stop 35 that extends outwardly from the cam arm 34 and a cam slot 36 adjacent the stop 35. The cam arm 34 may comprise a single cam arm operatively associated with both the lift arms 28, 30 to raise and lower the skinning assembly 14. The cam slot slidably receives a pin 38 therein and has a concave arcuate side that assists in forcing the pin 38 to a locked position.

The pin 38 is mounted to and extends between a clevis 40 such that the cam arm 34 is retained within the clevis 40. The clevis 40 has a finger portion 42 that extends outwardly and engages the stop 35 so that the clevis 40 does not slip out of position when the linkage assembly 14 is in the closed position (see FIG. 4).

A cam block 46 is secured to the frame 12 and includes a cam notch 48 located therein. The cam notch 48 includes a surface adapted to slidably receive an end of the pin 38 extending from the clevis 40. The cam notch 48 is shaped to lock the pin 38 when the linkage assembly 26 is in the open position (see FIG. 5). Specifically, the cam slot 36 works in conjunction with pin 38 and cam notch 48 to draw pin 38 into the locked position when lever 32 is moved to the open position.

A spring cartridge 50 is connected to and extends longitudinally from the clevis 40. The spring cartridge 50 provides a positive bias force on the clevis 40. This positive bias force on the clevis 40 assists in locking the pin 38 in the cam slot 36 when the linkage assembly 26 is in the closed position (see FIG. 4). As shown, the spring cartridge 50 of the linkage assembly 26 may comprise a single spring cartridge operatively associated with both the lift arms 28, 30.

Figure 6:
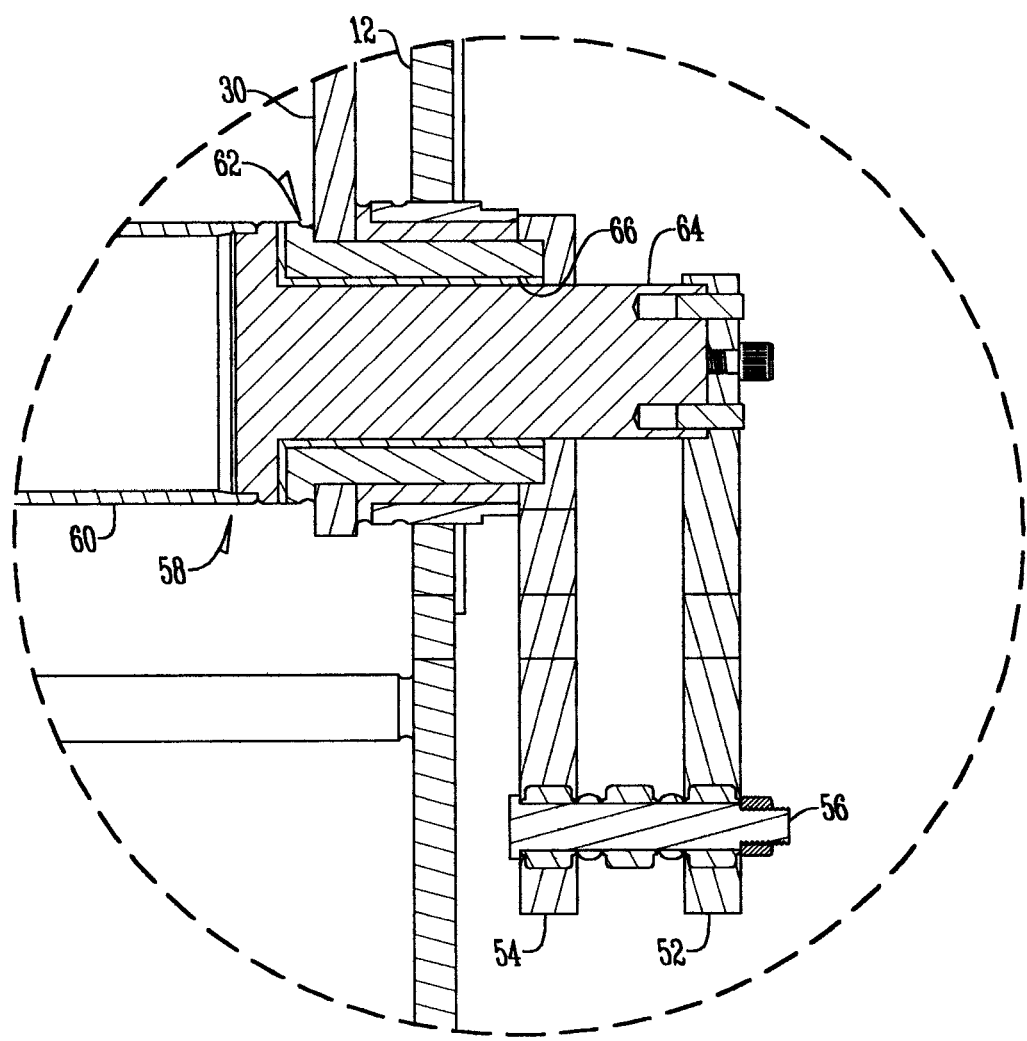
FIG. 6 is a partial cross sectional view of an intermediate link between outer and inner lever arms.

Referring to FIGS. 3 and 6, first and second lever arms 52, 54 are attached to the spring cartridge 50 via an intermediate link 56. The intermediate link 56 is connected to first and second lever arms 52, 54 via spherical bearings or the like such that first and second lever arms 52, 54 may rotate with respect to one another. Additionally or alternatively, the intermediate link 56 also applies a bias force to both the first and second lever arms 52, 54.

A Cylinder 58 is operatively connected to lift arms 28 and 30 and lever arms 52 and 54. The cylinder 58 has a first section 60 and a second section 62. The first section 60 is connected to lift arm 28 at one end and has a stem 64 that extends through an aperture in lift arm 30 and is connected to lever arm 52. The second section 62 has a bore 66 that extends therethrough and receives the stem portion 64 of the first section 60. The second section 62 is connected to lift arm 30 and lever arm 54.

In operation, as a meat part is pulled toward the skinning assembly 14 by the toothroll 16 the skinning assembly will float based on variations in the part's thickness. The end of the skinning assembly 14 connected to lift arm 28 will float independently of the opposite end connected to lift arm 30. For example, as a thicker portion of the meat part forces arm 28 upward, the first section 60 of cylinder 58 will rotate in relation to the second section 62 forcing lever arm 52 downward. The downward movement of lever arm 52 is restricted by intermediate link 56. Likewise, if a thicker portion of the meat part forces lift arm 30 upward, the second section 62 of the cylinder 58 rotates in relation to the first section 60 such that lever arm 54 is moved downwardly. The downward movement of lever arm 54 is restricted by intermediate link 56.

To open the skinning assembly for cleaning or repair, the lever 32 is moved downwardly. When the lever 32 moves downwardly, cam arm 34 moves toward cam block 46 causing pin 38 to bottom out in cam slot 36. When the pin 38 bottoms out in cam slot 36 the clevis 40 is drawn toward the cam block 46. As the clevis 40 is drawn toward the cam block 46 the spring cartridge 50 and lever arms 52 and 54 are also drawn toward the cam block 46 such that lift arms 28 and 30 rotate about cylinder 58 to lift the skinning assembly 14 to a raised or open position.

As cam arm 34 moves toward cam block 46, pin 38 engages and is received within cam notch 48. Cam notch 48 preferably has an arcuate shape with a ridge and a lower portion where the pin rides over the ridge and falls into the lower portion which locks the skinning assembly 14 in a raised or open position. In the locked position the pin 38 will not lift out of notch 48 when the skinning assembly 14 is moved.

To lower the skinning assembly 14 the lever 32 is raised. When the lever 32 is raised, pin 38 slides within notch 48 and slot 36 to release the pin 38 from the cam block 46. This allows the skinning assembly 14 to return to the closed or skinning position. The fingers 40 ensure that as cam arm 34 rotates downward, pin 38 slides to the correct position in cam slot 36.

With reference to FIGS. 1 and 5, meat parts processed by skinning machine 10 contact the machine 10 in a zone 68. The skinning assembly 14 is located in this food zone 68; however, the linkage assembly 26 is located primarily within the frame 12 away from the food zone 68. This location of linkage assembly 26 apart from food zone 68, has the advantage of improving the sanitary nature of the skinning machine 10. Specifically, the moving parts of linkage assembly 26 do not directly contact processed meat parts, resulting in fewer parts of skinning machine 10 contacting processed meat parts and therefore reducing the amounts of skinning machine 10 that needs to be sanitized.

Accordingly, a skinning machine having an asymmetrical design located on only one side of the skinning assembly limiting the number of parts of the skinning machine has been described. Likewise, a self-balancing mechanism for balancing the two sides of the skinning assembly via the intermediate link 56 has been described along with a lifting assembly that locks the skinning machine in an open position for cleaning.

It is therefore seen that the skinning machine will accomplish at least all of its stated objectives.

What is claimed is:

1. A skinning machine, comprising:
   a frame;
   a linkage assembly mounted to the frame;
   a skinning assembly mounted to the linkage assembly via lift arms;
   the linkage assembly connected to the lift arms and adapted to raise and lower the skinning assembly via the lift arms from an open position for cleaning to a closed position for skinning, wherein the linkage assembly is located on one side of the skinning assembly.

2. The skinning machine of claim 1, wherein the linkage assembly comprises a release lever rotatably mounted on the frame so that a user can move the linkage assembly from a closed to an open position.

3. A skinning machine, comprising:

a frame;

a linkage assembly mounted to the frame;

a skinning assembly mounted to the linkage assembly via lift arms; and the linkage assembly adapted to raise and lower the skinning assembly via the lift arms from an open position for cleaning to a closed position for skinning, wherein the linkage assembly is located on one side of the skinning assembly;

wherein the linkage assembly comprises a release lever rotatably mounted on the frame so that a user can move the linkage assembly from a closed to an open position;

wherein the linkage assembly comprises a cam arm attached to the release lever to rotate therewith, a cam slot is provided through the cam arm to slidably receive a pin therein, the cam slot is shaped to lock the pin when the linkage assembly is in the closed position.

4. The skinning machine of claim 3 wherein the linkage assembly comprises a single cam arm operatively associated with both the lift arms.

5. The skinning machine of claim 3, wherein the linkage assembly comprises a clevis adapted to secure the pin within the cam slot, a finger surface on the clevis adapted to slidably engage a stop knob extending from the cam arm so that the clevis does not slip out of position when the linkage assembly is in the closed position.

6. The skinning machine of claim 3, wherein the linkage assembly comprises a clevis adapted to secure the pin within the cam slot so that an end of the pin extends beyond the edge of the clevis, a cam block mounted to the frame includes a cam notch adapted to slidably secure the end of the pin extending from the clevis in a locked open position.

7. The skinning machine of claim 3, wherein the linkage assembly comprises a clevis adapted to secure the pin within the cam slot, a spring cartridge is connected to the clevis and adapted to provide a positive bias force on the clevis with respect to the cam slot.

8. The skinning machine of claim 3 wherein the linkage assembly comprises a single spring cartridge operatively associated with both the lift arms.

9. The skinning machine of claim 3, wherein the linkage assembly comprises outer and inner lever arms attached to the spring cartridge via an intermediate link, wherein the intermediate link connects the lower ends of the outer and inner lever arms together so that the outer and inner lever arms may rotate with respect to one another.

10. The skinning machine of claim 9, wherein the lift arms include an outer and an inner lift arm, and wherein the outer lever arm and outer lift arm are secured to rotate together, the inner lever arm and inner lift arm are secured to rotate together, and wherein the outer lever arm and outer lift arm pair rotate with respect to the inner lever arm and inner lift arm pair.

11. The skinning machine of claim 9, wherein the intermediate link is adapted to equally apply bias force from and to both the outer and inner lever arms.

12. A skinning machine, comprising:

a frame;

a linkage assembly mounted to the frame;

a skinning assembly mounted to the linkage assembly via lift arms, wherein the lift arms rotate independently from one another;

the linkage assembly adapted to raise and lower the skinning assembly via the lift arms from an open position for cleaning to a closed position for skinning, wherein the linkage assembly comprises a spring cartridge operatively associated with the lift arms via an intermediate link, wherein the intermediate link is adapted to equally apply bias force from the spring cartridge to the independently rotatable lift arms.

\* \* \* \* \*